United States Patent [19]

Wilkinson

[11] Patent Number: 4,922,329
[45] Date of Patent: May 1, 1990

[54] APPARATUS FOR CODING A DIGITAL COMPONENT VIDEO SIGNAL

[75] Inventor: James H. Wilkinson, Tadley, United Kingdom

[73] Assignee: Sony Corporation, Tokyo, Japan

[21] Appl. No.: 223,387

[22] Filed: Jul. 25, 1988

[30] Foreign Application Priority Data

Jul. 31, 1987 [JP] Japan .................................. 62-192226

[51] Int. Cl.⁵ ............................................ H04N 11/06
[52] U.S. Cl. ......................................... 358/12; 358/13; 358/16
[58] Field of Search .................. 358/12, 31, 16, 13

[56] References Cited

U.S. PATENT DOCUMENTS

| | | | |
|---|---|---|---|
| 4,296,431 | 10/1981 | Holland | 358/16 |
| 4,322,739 | 3/1982 | Drewery et al. | 358/13 |
| 4,742,386 | 5/1988 | Wilkinson | 358/13 |

FOREIGN PATENT DOCUMENTS 0070891 4/1986 Japan ..................................... 358/12

Primary Examiner—James J. Groody
Assistant Examiner—David E. Harvey
Attorney, Agent, or Firm—Alvin Sinderbrand

[57] ABSTRACT

Apparatus for coding a digital component video signal, comprising first means for modulating a first carrier signal with one of the component chrominance signals, the first carrier signal having a four-field sequence such that the phase of the first carrier signal is inverted at every line interval, second means for modulating a second carrier signal with the other of the component chrominance signals, the second carrier signal having a two-field sequence such that the phase of the second carrier signal is inverted at every field interval, and means for combining a luminance signal with the modulated chrominance signals to thereby reduce the bandwidth of the combined component video signal.

6 Claims, 7 Drawing Sheets

CB carrier

CR carrier

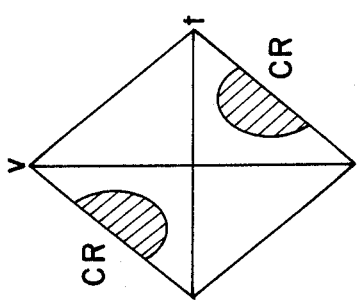
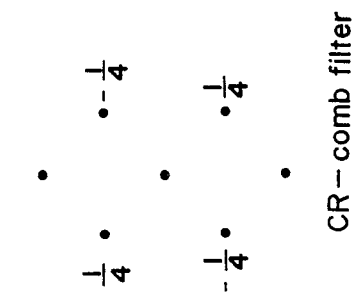
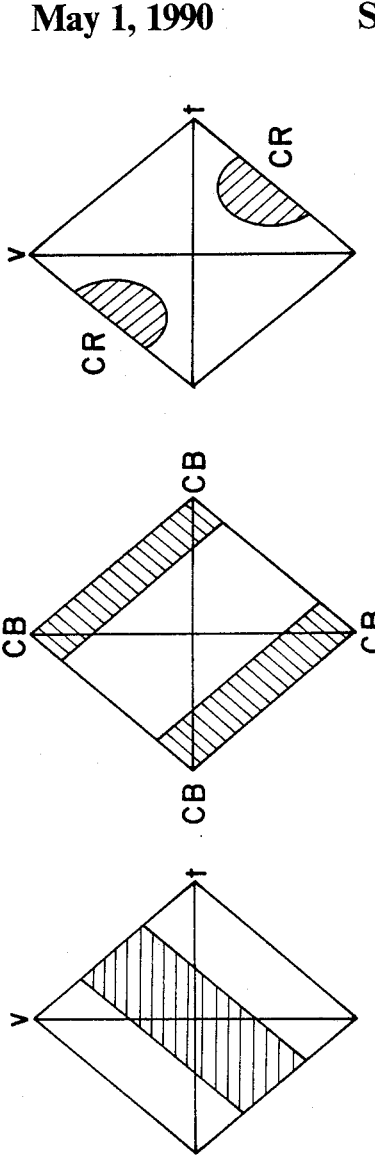
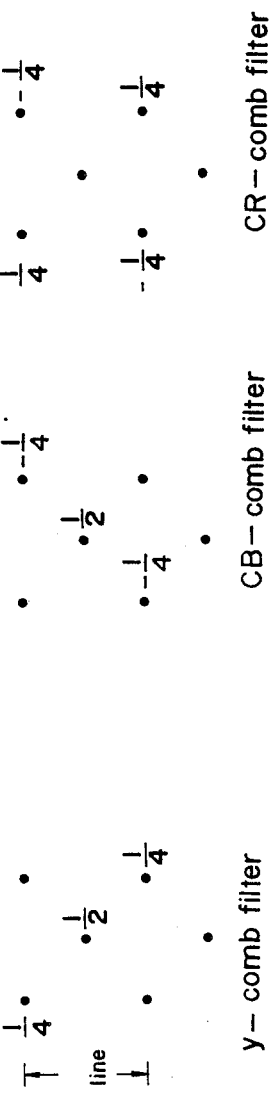
FIG. 7A — y—comb filter
FIG. 7B — CB—comb filter
FIG. 7C — CR—comb filter CB — comb filter CR — comb filter

APPARATUS FOR CODING A DIGITAL COMPONENT VIDEO SIGNAL

BACKGROUND OF THE INVENTION

1. Field of the Invention

The present invention relates to an apparatus for coding a digital component video signal.

2. Description of the Prior Art

In the CCIR601 standard coding scheme (4:2:2), out of a total bandwidth of 13.5 MHz, the frequency band 6.75 MHz is allotted to the luminance component and the remaining frequency band 3.375 MHz is allotted to each of the chrominance components. In order to reduce the total bandwidth to half, it was proposed to halve the allotted bandwidths to the luminance component and chrominance components. Although the chrominance component thus reduced in bandwidth can still provide adequate quality, the luminance component suffers due to the reduced bandwidth having the minimum frequency 3.375 MHz. To achieve quality reproduction, a maximum frequency of at least 5 MHz is needed.

SUMMARY OF THE INVENTION

An object of the present invention is to provide an apparatus for coding a digital component video signal capable of reducing the transmission bandwidth to half and yet capable of securing a sufficient bandwidth for the luminance signal.

According to the present invention, an apparatus is provided for coding a digital component video signal which includes a luminance signal and a first and a second chrominance component signal modulated by a carrier signal having a frequency higher that the frequency spectrum range of the luminance signal. The first chrominance component signal has a four-field sequence such that its phase is inverted at every line interval. The second chrominance component signal has a two-field sequence such that its phase is inverted at every field interval.

The luminance component and the modulated chrominance component signal are arranged in frequency interleaved relation. Therefore, these signals can be separated by a comb filter. Since the carrier signal for the chrominance component is of a frequency outside the range of the bandwidth of the luminance signal, the separation of the luminance component and the chrominance component is very easy. The two chrominance components can be separated time-wise.

The first and second color difference components are both interleaved in relation to the luminance component. Further, since the first color difference component and the second color difference component are made different as to modulation phases such that the one has a four-field sequence and the other has a two-field sequence, these components can be also separated by means of a comb filter. Regarding the comb filter, either of two kinds of comb filters can be used. One kind utilizes correlation in the direction of both the field and the line. The other utilizes correlation in the direction of the line. Hence, it is possible to selectively switch these comb filters from one to the other in response to abrupt changes in color.

BRIEF DESCRIPTION OF THE DRAWINGS

FIG. 7A-7C are schematic diagrams showing the frequency response and filter factors of comb filters for separating each component;

DESCRIPTION OF THE PREFERRED EMBODIMENT

In a preferred embodiment of the present invention, a digital component video signal of (4:2:2) form is converted into a composite signal of (4:0:0) form. As the carrier signal for modulation of the chrominance component signals, a signal is used having a frequency outside the range of the bandwidth of the luminance component.

Figure 1:
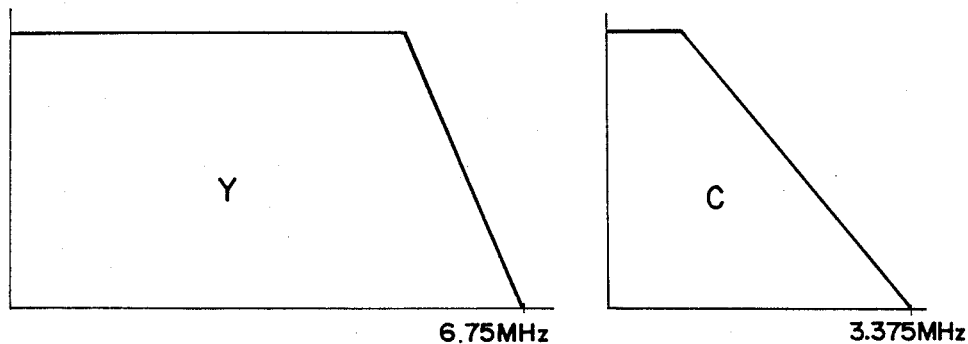
FIG. 1 is a frequency spectrum chart showing the necessary bandwidth for each of the luminance component and chrominance component of a component video signal.

FIG. 1 are charts showing necessary bandwidths for the luminance component signal and the chrominance component signals in a component video signal. The luminance component Y requires a bandwidth with an upper limit frequency of 6.75 MHz, while the chrominance components C require a bandwidth with an upper limit frequency of 3.375 MHz.

Figure 2:
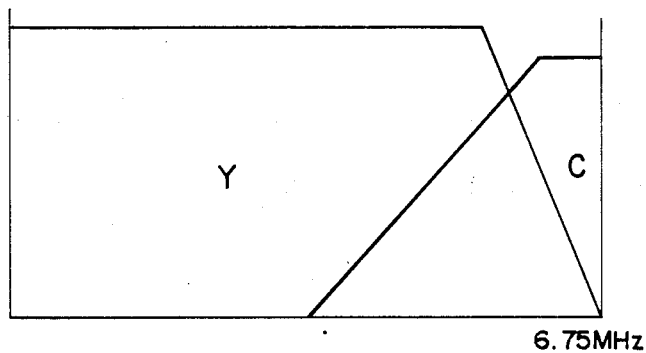
FIG. 2 is a frequency spectrum chart showing a composite signal in which the luminance component and chrominance component are combined.

FIG. 2 shows a frequency spectrum of a composite signal obtained by combination of the aforesaid luminance component Y and the chrominance components C. The two chrominance components are modulated with the carrier signal having a frequency of approximatley 6.75 MHz. The spectral components of the luminance component and the modulated chrominance components are arranged in interleaved relation whereby unwanted interference is minimized. The interleaving relationship is similar to that practiced the NTSC system.

A fundamental difference between the coding scheme shown in FIG. 2 and that of the PAL or NTSC system is that the carrier signal for the chrominance components lies outside the range of the bandwidth of the luminance component. Thereby, it is easy to separate the luminance component from the chrominance components.

Figure 3:
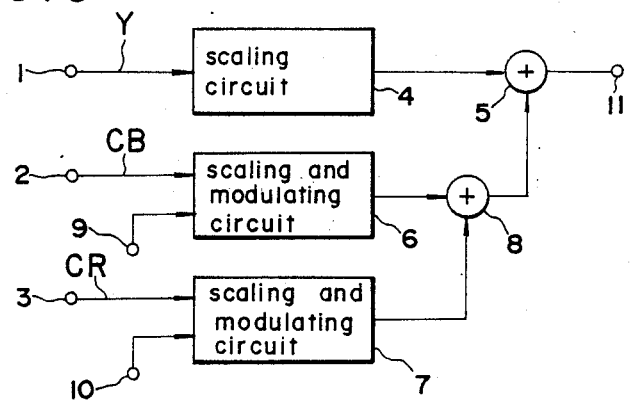
FIG. 3 is a block diagram of an encoder in an embodiment of the present invention.

FIG. 3 is a block diagram of an encoder in an embodiment of the present invention. Referring to FIG. 3, an input terminal denoted by 1 is supplied with a luminance component Y, an input terminal denoted by 2 is supplied with a color difference component CB being (B−Y) component, and an input terminal denoted by 3 is supplied with a color difference component CR being (R−Y) component.

The luminance component Y is supplied through a scaling circuit 4 to an adder circuit 5. The color difference component CB is supplied through a scaling and modulating circuit 6 to an adder circuit 8. The color difference component CR is supplied through a scaling and modulating circuit 7 to the adder circuit 8. The output signal of the adder circuit 8 is supplied to the adder circuit 5, wherefrom an output terminal 11 is led out. The scaling circuit is used for suppressing an increase in amplitude of the output signal as a result of the adding process. The scaling and modulating circuit 6 is supplied with a carrier signal from a terminal 9, the phase of which is inverted from frame to frame in a two-field sequence of phase inversions. Likewise, the scaling and modulating circuit 7 is supplied with a carrier signal from a terminal 10, the phase of which is not changed whereby the modulated carrier signal has a four-field sequence of phase inversions.

Figure 4A:
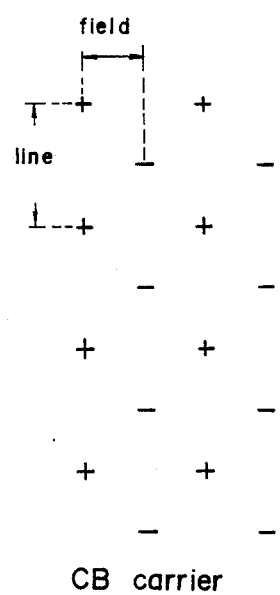
FIG. 4A and 4B are schematic diagrams showing modulation phases of chrominance components.
Figure 4B:
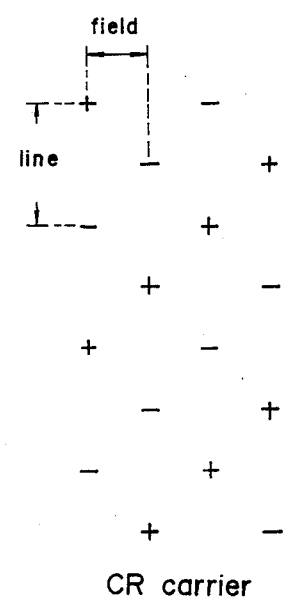

The color difference components CB and CR modulate these carrier signals, whereby the polarities of the modulated color difference components with respect to the luminance signal will be such one as shown in FIG. 4A and FIG. 4B. In FIG. 4A and FIG. 4B, sign + indicates (Y+C) and sign − indicates (Y−C).

As seen from FIG. 4A and FIG. 4B, the carrier signal for the chrominance component CB is a signal of a two-field sequence inverted at every field interval.

In addition, the carrier signal for the chrominance component CR is a signal of a four-field sequence inverted at every line interval.

Figure 5A:
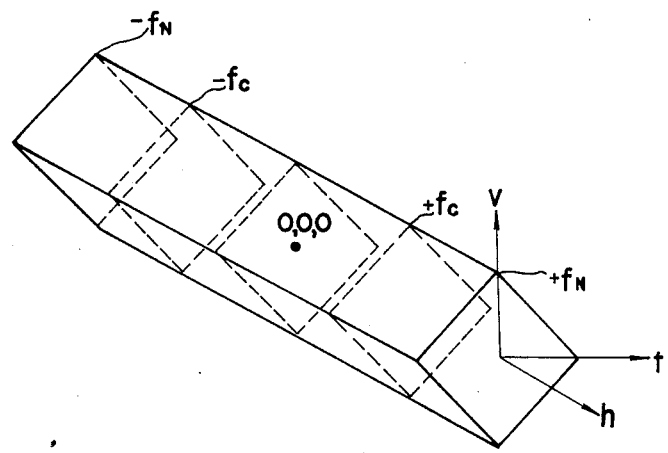
FIG. 5A and 5B are schematic digrams showing a three dimensional representation and its three projections of a digiral video signal.
Figure 5B:
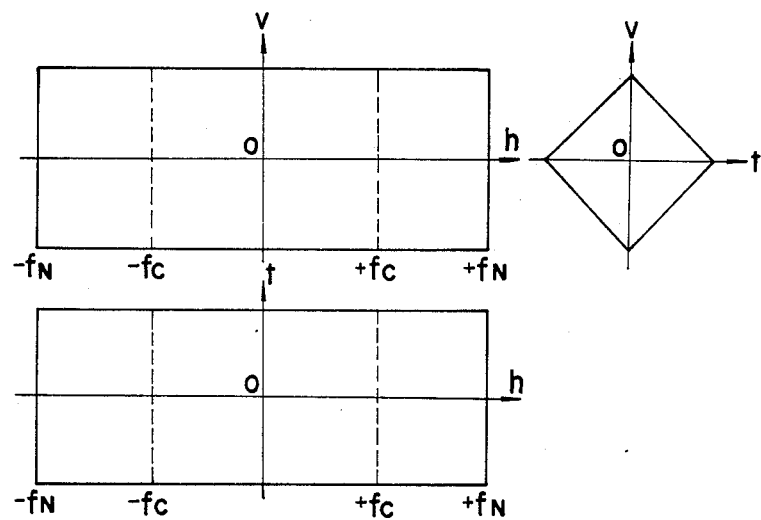

The most general way to show interrelations of the three components Y, CB and CR utilizes a three-dimensional representation of the Nyquist limit of a digital video signal as shown in FIG. 5A and its three projections as shown in FIG. 5B. The three axes are vertical axis (V), horizontal axis (h), and time axis (t). The broken lines $\pm f_c$ virtually are coincident with the positions of the color subcarriers in the NTSC system. As far as the above described video coding scheme is concerned, the region of bandwidth between $+f_c$ and $-f_c$ includes only the luminance component Y and the region between $+f_c$ and horizontal Nyquist frequency $+f_N$ and between $-f_c$ and $-f_N$ include the three components.

Figure 6:
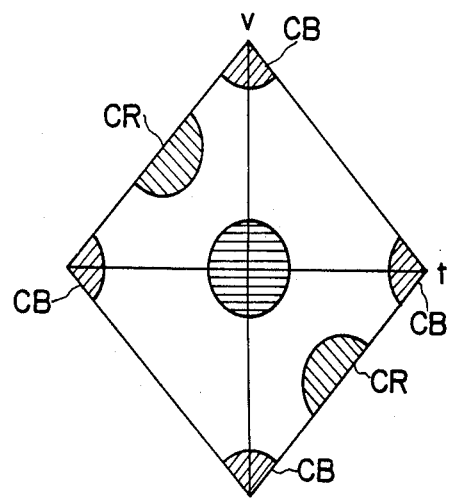
FIG. 6 is a v-t projection showing positions of each component of a coded digital video signal.

FIG. 6 is a projection on the v-t plane showing positions of the luminance component and chrominance components of the digital video signal in the vicinity of the Nyquist frequencies. The luminance component Y gathers around the origin O, and the chrominance component CB converges on the corner regions, while the chrominance component CR converges at the intermediate of the oblique lines.

The separation of the components Y, CB, and Cr as shown in FIG. 6 is performed by comb filters. FIG. 7 shows examples of frequency response and simple filter factors of the comb filters separating each component.

FIG. 7A shows the frequency response and filter factor of the comb filter for separating the luminance component Y. When the component video signal having the phase relations of the carrier signals as shown in FIG. 4A and FIG. 4B is applied to the comb filter having the filter factor as represented in FIG. 7A, the color difference components CB and CR are canceled and only the luminance component Y is separated therefrom. FIG. 7B shows the frequency response and filter factor of the comb filter for separating the color difference component CB. By the use of this comb filter, the luminance component Y and the color difference component CR are canceled and only the color difference components CB is separated therefrom. FIG. 7C shows the frequency response and filter factor of the comb filter for separating the color difference component CR.

Figure 8A:
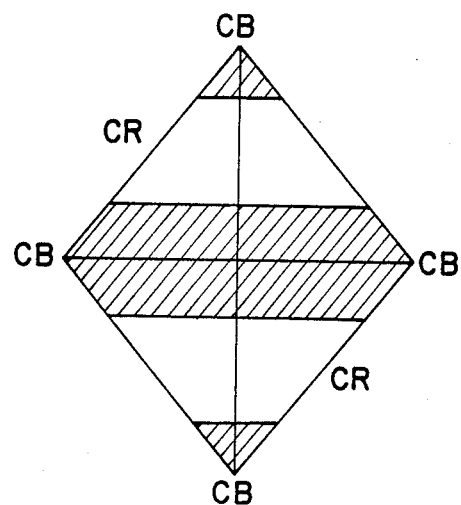
FIG. 8A and 8B are schematic diagrams showing the frequency response of comb filters for separating two color difference components.
Figure 8B:
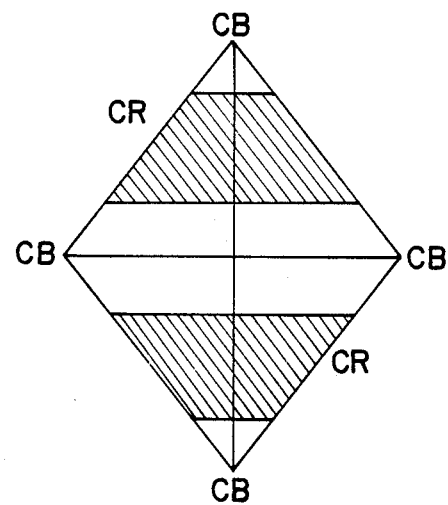

The two color difference components can also be separated by utilizing the fact that the carrier signal for the color difference component CB is not inverted at every line interval, while the carrier signal for the color difference component CR is inverted at every line interval. FIG. 8A and FIG. 8B show comb filters for only the vertical direction (line comb filters). FIG. 8A shows the frequency response of the comb filter for separating the color difference component CB, while FIG. 8B shows the frequency response of the comb filter for separating the color difference component CR. In FIG. 7 and FIGS. 8, the hatched portions indicate the regions providing large output signals (passing regions). The line comb filters shown in FIG. 8 may contain a certain amount of cross color due to high-frequency component of the luminance signal. However, different from the comb filters shown in FIG. 7, there is an advantage that the filter need not use data of other fields.

Since the two types of the comb filters are available as described above, an adaptive configuration of a decoder can be considered which will use the comb filters as shown in FIG. 7 when there exists a field or frame correlation, but will use the comb filters as shown in FIG. 8 when there is no field or frame correlation.

Figure 9:
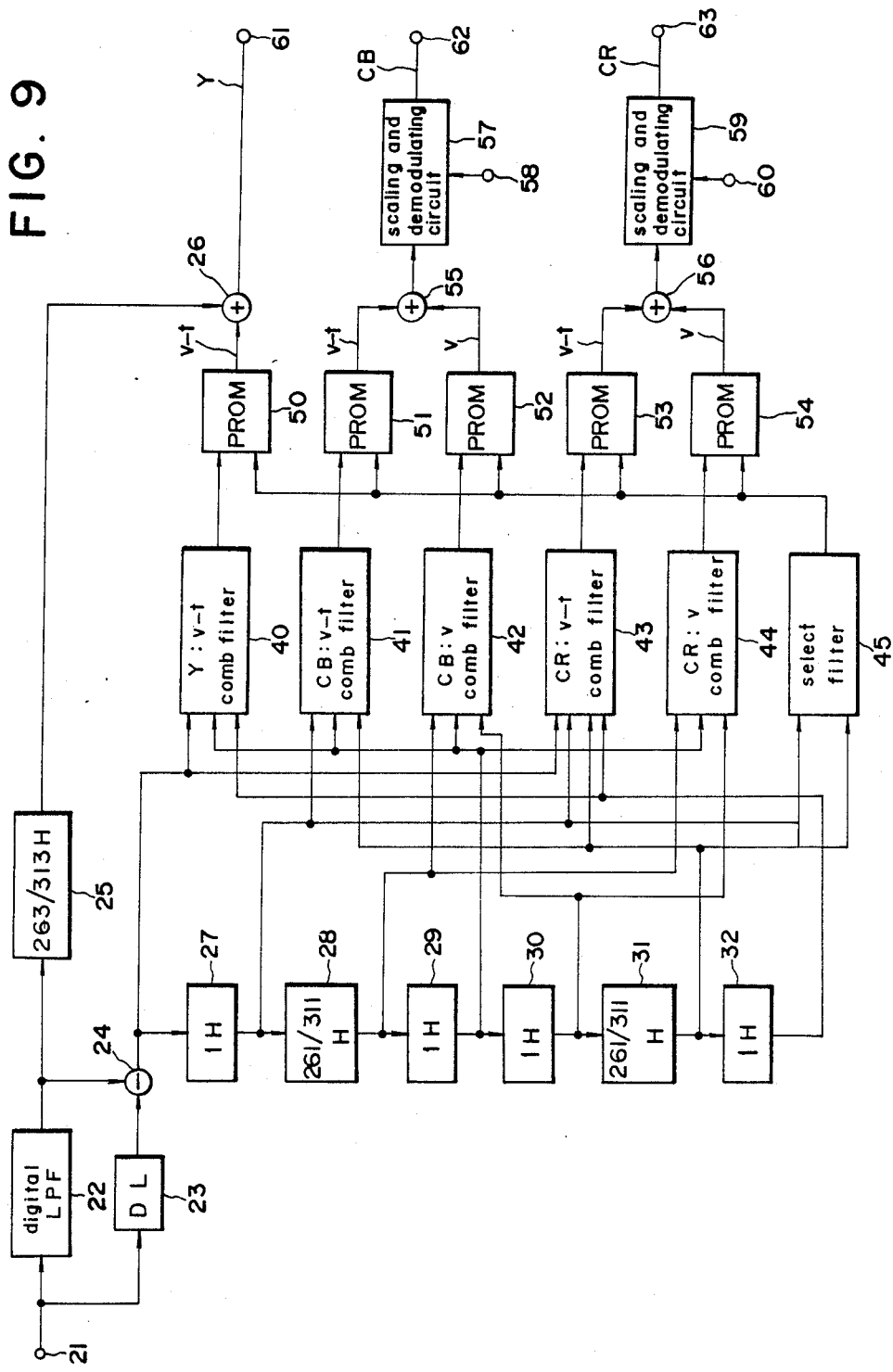
FIG. 9 is a block diagram showing an adaptive decoder.

FIG. 9 shows an example configuration of such an adaptive decoder. Referring to FIG. 9, an input terminal denoted by 21 is supplied with a coded digital video signal which is for example, reproduced from a magnetic tape and on the reproduction side subjected to error correction or error concealment. The input coded signal is supplied to a digital low-pass filter 22 and a delay circuit 23. The delay circuit 23 has a delay amount equal to that of the digital low-pass filter 22. The luminance signal is obtained from the output signal of the low-pass filter 22. The output signals of the low-pass filter 22 and the delay circuit 23 are supplied to a subtracter circuit 24. As the output of the subtracter circuit 24, a high-pass component is obtained. The output signal of the low-pass filter 22 is supplied through a delay circuit 26 to an adder circuit 25.

The output terminal of the subtractor circuit 24 is connected with a cascade connection of delay circuits 27, 28, 29, 30, 31, and 32. The delay amount of each of the delay circuits 27, 29, 30, and 32 is one H (one horizontal period). The delay amount of each of the delay circuits 28 and 31 is 261 H (525 system) or 311 H (625 system). The output terminal of the subtracter circuit 24 and the output terminals of the delay circuit 27, 28, 29, 30, 31 and 32 are selectively connected with comb filters 40, 41, 42, 43 and 44, as specifically shown in FIG. 9.

The comb filter 40 is for separating the luminance component Y having the characteristic as shown in FIG. 7A. The comb filter 41 is for separating the color difference component CB as shown in FIG. 7B. The comb filter 42 is the line comb filter for separating the color difference component CB having the characteristic as shown in FIG. 8A. The comb filter 43 is for separating the color difference component CR having the characteristic as shown in FIG. 7C. The comb filter 44 is the line comb filter for separating the color difference component CR having the characteristic as shown in FIG. 8B. The output singnals of these comb filters 40, 41, 42, 43 and 44 are supplied, respectively, to PROMs 50, 52, 52, 53 and 54.

The output signal of the PROM 50 (the high-frequency component of the luminance component Y) is supplied to the adder circuit 26 to be added therein with the low-frequency luminance component passed through the compensation delay circuit 25. The output signal of the adder circuit 26 is obtained at an output terminal 61 as a coded luminance component Y.

The output signals of the PROM 51 and PROM 52 are supplied to an adder circuit 55, and the output signals of the PROM 53 and PROM 54 are supplied to an adder circuit 56. The PROMs 50-54 are provided for giving desired switching characteristics to the outputs of the five comb filters 40-44. One of the switching characteristics is a simple changeover switching and another is more complicated switching characteristic such as a cross fade. In order to control the switching characterisics of the PROMs 50-54, a select filter 45, to be described later, is provided.

The output signal of the adder circuit 55 is supplied to a scaling and demodulating circuit 57. From a terminal 58 is supplied a carrier signal for demodulation. At an output terminal 62, a decoded color difference component CB is obtained. The output signal of the adder circuit 56 is supplied to a scaling and demodulating circuit 59. From a terminal 60 is supplied a carrier signal for demodulation. At an output terminal 63, a decoded color difference component CR is obtained.

Figure 10:
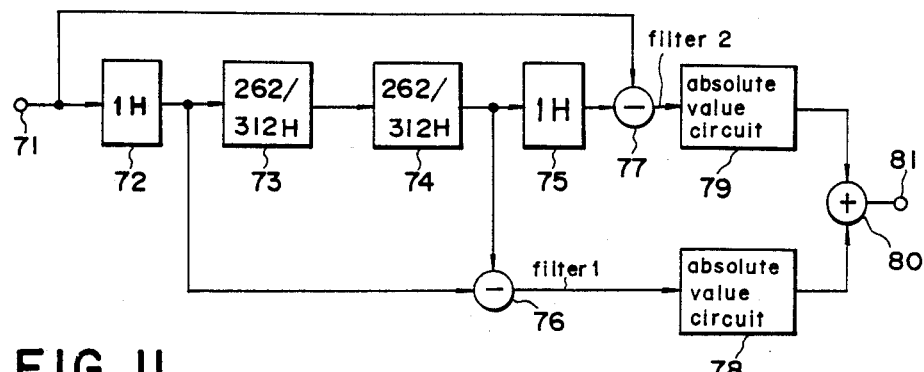
FIG. 10 is a block diagram of a select filter for use in the adaptive decoder.

FIG. 10 shows an example of the select filter 45. Referring to FIG. 10, the input terminal denoted by 71 is connected with a cascade connection of delay circuits 72, 73, 74, and 75. The delay amount of the delay circuits 72 and 75 is one H and the delay amount of the the delay circuits 73 and 74 is 262 H (525 system) or 312 H (625 system). The output signal of the delay circuit 72 and the output signal of the delay circuit 74 are supplied to a subtracter circuit 76. The output signal of the subtracter circuit 76 is the output signal of a filter 1. The output signal of the delay circuit 75 and the input signal are supplied to a subtracter circuit 77. The output signal of the subtracter circuit 77 is the output signal of a filter 2.

The output signal of the subtracter circuit 76 is supplied to an absolute value circuit 78 and the output signal of the absolute value circuit 78 is supplied to an adder circuit 80. Likewise, the output signal of the subtracter circuit 77 is supplied to an absolute value circuit 79 and the output signal of the absolute value circuit 79 is supplied to the adder circuit 80. From the adder circuit 80 is led out an output terminal 81.

Figure 11:
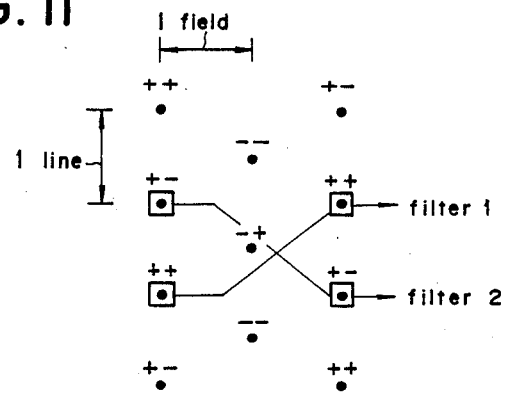
FIG. 11 is a schematic diagram useful for explanation of operation of a select filter.

FIG. 11 shows the data which are dealt with by the filter 1 and the filter 2 as the objects of processing. The filter 1 and the filter 2 each are for providing a differential between data at the same modulation phase included in each of the preceding and succeeding fields of the field for which decoding is being performed. The output signals of filter 1 and filter 2 indicate whether there is a sudden change in color produced by the movement of a subject or the like. When a sudden change in color is produced, the amplitude of each of the outputs of the filter 1 and the filter 2 becomes larger. In such a case, output signals of the comb filters 42, 44 are preferred to those of the comb filters 41, 43 and therefore, the select filter 45 generates a control signal for selecting such output signals.

Figure 12A:
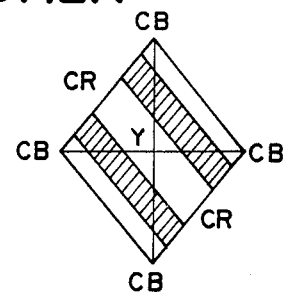
FIG. 12A and 12B are schematic diagrams showing the frequency response of the select filter.
Figure 12B:
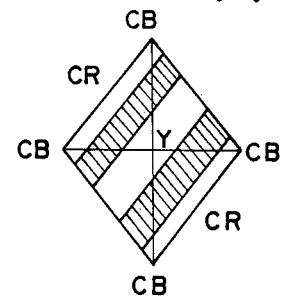

FIG. 12A and FIG. 12B show the frequency responses of filter 1 and filter 2, respectively. In FIG. 12, the regions indicated by oblique lines are where output signals are generated at a high level. There is no need of using both filter 1 and filter 2, but use of one of the two is enough. In fact, only filter 1 is used in the adaptive decoder shown in FIG. 9.

According to the present invention, by coding a component digital video signal into the form of a composite video signal, the bandwidth necessary for transmission can be reduced to half. Further, by appropriately devising the modulating systems for the first color difference component and the second color difference component, these two color difference can be separated with the use of two types of comb filters, one utilizing both the interline and the interfield correlations and the other utilizing only the line correlation, and thereby an adaptive decoder may be structured.

What is claimed is:

1. Apparatus for coding a digital component video signal having first and second component chrominance signals and a component luminance signal having a predetermined bandwidth, comprising:

first means for modulating a first carrier signal with the first component chrominance signal to generate a first modulated chrominance signal, said first carrier signal having a frequency approximately at the upper end of said bandwidth and a four-field sequence such that the phase of the first carrier signal is inverted at every line interval;

second means for modulating a second carrier signal with the second component chrominance signal to generate a second modulated chrominance signal, said second carrier signal having substantially the same frequency as said first carrier signal and a two-field sequence such that the phase of the second carrier signal is inverted at every field interval; and means for combining the luminance signal with the first and second modulated chrominance signals to generate a combined component video signal of reduced overall bandwidth substantially equivalent to said predetermined bandwidth of the component luminance signal wherein said first and second modulated chrominance signals have substantially no frequency components that exceed the frequency of the first and second carrier signals 2. Apparatus according to claim 1, in which the frequency at the upper end of said predetermined bandwidth is substantially 6.75 MHz.

3. Apparatus according to claim 1, in which said first component chrominance signal comprises a blue difference signal (B−Y).

4. Apparatus according to claim 1, in which said second component chrominance signal comprises a red difference signal (R−Y).

5. Method for coding a digital component video signal having first and second component chrominance signals and a component luminance signal having a predetermined bandwidth, comprising the steps of:

modulating a first carrier signal with the first component chrominance signal to generate a first modulated chrominance signal, said first carrier signal having a frequency approximately at the upper end of said bandwidth and a four-field sequence such that the phase of the first carrier signal is inverted at every line interval;

modulating a second carrier signal with the second component chrominance signal to generate a second modulated chrominance signal, said second carrier signal having substantially the same frequency as said first carrier signal and a two-field sequence such that the phase of the second carrier signal is inverted at every field interval; and combining the luminance signal with the first and second modulated chrominance signals for generating a combined component video signal of reduced overall bandwidth substantially equivalent to said predetermined bandwidth of the component luminance signal wherein said first and second modulated signal have substantially no frequency components that exceed the frequency of the first and second carrier signals 6. The method as defined in claim 5 wherein the frequency at the upper end of said predetermined bandwidth is substantially 6.75 MHz.

* * * * *